United States Patent [19]
Yunlu et al.

[11] Patent Number: 6,111,082
[45] Date of Patent: Aug. 29, 2000

[54] STABLE CONCENTRATED RARE EARTH CARBOXYLATE LIQUIDS

[75] Inventors: Kenan Yunlu, Princeton; Min He, East Windsor; Jean-Pierre Cuif, Princeton, all of N.J.; Michel Alas, Melle, France

[73] Assignee: Rhodia Rare Earths Inc., Shelton, Conn.

[21] Appl. No.: 09/062,236

[22] Filed: Apr. 17, 1998

[51] Int. Cl.[7] .................................. C07F 5/00; C08F 4/44
[52] U.S. Cl. .............................. 534/16; 534/15; 526/164; 502/102; 502/117; 502/152; 502/170
[58] Field of Search ......................... 534/15, 16; 526/164; 502/102, 117, 152, 170

[56] References Cited

U.S. PATENT DOCUMENTS

| | | | |
|---|---|---|---|
| 4,461,883 | 7/1984 | Takeuchi et al. | 526/139 |
| 4,699,962 | 10/1987 | Hsieh et al. | 526/142 |
| 4,791,086 | 12/1988 | Yeh et al. | 502/102 |
| 5,017,539 | 5/1991 | Jenkins et al. | 502/102 |
| 5,220,045 | 6/1993 | Knauf et al. | 556/55 |
| 5,360,898 | 11/1994 | Jordaan et al. | 534/16 |
| 5,428,119 | 6/1995 | Knauf et al. | 526/153 |
| 5,686,371 | 11/1997 | Ansell et al. | 502/102 |
| 5,731,381 | 3/1998 | Apecetche et al. | 526/83 |
| 5,783,676 | 7/1998 | Yunlu | 534/15 |
| 5,858,903 | 1/1999 | Sylvester et al. | 502/118 |

OTHER PUBLICATIONS

Ohashi et al., Chemical Abstracts, 111:98813, 1989.
Natori, Chemical Abstracts, 122:106779, 1995.
Ikematsu et al., Chemical Abstracts, 120:32686, 1984.

*Primary Examiner*—Fiona T. Powers
*Attorney, Agent, or Firm*—Katherine L. Carleton

[57] ABSTRACT

Stable Rare Earth carboxylate liquids having high concentrations of Rare Earths and suitable for use in forming active Ziegler Natta catalysts, are prepared with stabilizing agents such as water and/or acid. The liquids comprise from about 4.5% to about 20% Rare Earth element(s). A novel process for making is disclosed.

60 Claims, No Drawings

6,111,082

STABLE CONCENTRATED RARE EARTH CARBOXYLATE LIQUIDS

FIELD OF THE INVENTION

The invention relates to Rare Earth carboxylate liquids having high concentrations of Rare Earth elements and preferably low viscosity.

BACKGROUND OF THE INVENTION

Butadiene rubber may be produced utilizing catalysts of the Ziegler Natta type or by anionic lithium initiators. Ziegler Natta (Z/N) catalysts are generally preferred for producing high cis polybutadiene. An active Z/N catalyst system comprises a transition metal or Rare Earth compound and at least one or two co-catalysts. Rare Earth compounds suitable of forming active Z/N catalysts are Rare Earth carboxylates. Rare Earth carboxylates have several benefits for the butadiene formulator in that they have relatively high solubility in hydrocarbons, a polymerization medium, and reduced air sensitivity in comparison to Rare Earth alkoxides, for example.

In the world market, there are several applications for butadiene rubber. These include the production of tires, high impact polystyrene, shoe soles and golf balls. The production of tires is the major application. In tires, a high cis butadiene rubber can provide for higher abrasion resistance and a low heat build-up of tire treads, higher crack growth resistance in the side walls of radial tires, and lower rolling resistance. The production of polybutadienes with high cis isomer content is of greater interest today in view of potential shortages of natural rubber. Rare Earth carboxylates with the ability to enhance the production of high cis polybutadiene are needed. The object of this invention is to provide such a Rare Earth carboxylate.

Currently, Rare Earth carboxylates are produced and provided to the formulator in solvent, typically an organic solvent. The production of concentrated Rare Earth carboxylate liquids with long chain (C6 to C32), branched carboxylic acids is a very desirable goal in view of the beneficial reduction in commercial storage and shipping costs and the technical benefit of providing an active material in less solvent. Such a material would be easier to handle and ship. Additionally, it would provide greater flexibility for the formulator.

The concentrated Rare Earth carboxylate liquids would provide greater than 4.5% Rare Earth elements and preferably still be stable under normal storage and use conditions. Concentrated Rare Earth carboxylate liquids would preferably provide equivalent stability to commercially available Rare Earth carboxylate solutions. Instability is demonstrated by precipitation and/or a foggy or hazy appearance and/or an increase in viscosity.

The object of the present invention is to provide concentrated Rare Earth carboxylate liquids comprising from greater than about 4.5% to about 20% Rare Earth elements by weight. Preferably, the liquid has a viscosity of less than about 300 cps.

SUMMARY OF THE INVENTION

The invention relates to concentrated liquid carboxylates of Rare Earth elements, particularly Nd, La, Pr and Ce, where the ligands coordinated to the metal are preferably carboxylic acids, most preferably 2-ethylhexanoic, neodecanoic (versatic) and naphthenic acids. These liquids comprise from 4.5% to about 20% Rare Earth elements, preferably from about 4.5% to about 14%. Additionally, a process for making said compositions is described.

Unless otherwise stated, all parts, ratios or percents are by weight.

As used herein, "alkyl" means a carbon-containing chain which may be straight, branched or cyclic; substituted (mono- or poly-) or unsaturated; and saturated.

As used herein, "free acid" means the H+concentration as measured by an acid base titration utilizing an aqueous solution and preferably utilizing sodium hydroxide as the basic titrant.

"Comprising" as used herein, means various components can be conjointly employed. Accordingly, the terms "consisting essentially of" and "consisting of" are embodied in the term comprising.

DETAILED DESCRIPTION OF THE INVENTION

The Rare Earth carboxylate liquids comprise Rare Earth carboxylates. The Rare Earth carboxylates are preferably prepared utilizing carboxylic acids and a water soluble Rare Earth salt.

The carboxylic acids suitable for use include aliphatic, cycloaliphatic, alicyclic, and aromatic mono-and polybasic carboxylic acids. The acids may be saturated or unsaturated, straight or branched chained. The organic carboxylic acid can be either natural or synthetic or mixtures thereof. Examples of natural acids, although usually refined, include straight and branched chain carboxylic acids and mixtures such as tall oil acids and cyclic carboxylic acids such as naphthenic acid. A variety of synthetic carboxylic acids and particularly aliphatic or alicyclic mono-carboxylic acids or mixtures thereof, are useful. Long chain, branched carboxylic acids are preferred.

The organic carboxylic acids are preferably C6 to C32, more preferably C5 to C18 and most preferably C8 to C10. When mixtures are exployed, C5, C2 or less than C6 can be utilized as one or more of the acids of the mixtures. Preferably, the C6 or less carboxylic acids are present in minor amounts in comparison to the greater than C6 carboxylic acids which are present. Examples of useful organic carboxylic acids include isopentanoic acid, hexanoic acid, 2-ethyl butyric acid, nonanoic acid, decanoic acid, 2-ethyl hexanoic acid, iso octanoic acid, octanoic acid, isononanoic acid, neodecanoic acid (versatic acid), undecylenic acid, lauric acid, palmitic acid, stearic acid, oleic acid, linoleic acid, and commercially available mixtures of two or more carboxylic acids such as naphthenic acids. The acid number for a preferred naphthenic acid is from about 160 to about 300 mg KOH/g. Mixtures of carboxylic acids are suitable for use.

Preferred carboxylic acids for use are neodecanoic acids (such as Versatic Acid supplied by Shell and Neodecanoic Acid supplied by Exxon), 2-ethyl hexanoic acid, naphthenic acid (preferably having an acid number of from about 160 to about 300 mg KOH/g), 2-methyl butanoic acid, 3-methyl butanoic acid, 2,2-dimethyl propanoic acid, 3,5 dimethyl hexanoic acid, 2-ethyl pentanoic acid, 2,5 dimethyl hexanoic acid, 3-ethyl hexanoic acid, 2,2,4-trimethyl hexanedioic acid, 3,3,4-trimethyl hexanedioic acid, octanoic acid, neodecanoic acid, 2,6-dimethyl octanoic acid, 4,6-dimethyl octanoic acid, 2,4,6-trimethyl octanoic acid, 2,4,6-trimethyl nonanoic acid, and 2,4,6-trimethyl nonacosonoic acid.

The most preferred carboxylic acids for use are naphthenic acid (preferably having an acid number of from about 160 to about 300 mg KOH/g), neodecanoic acid (versatic acid), octanoic acid, and 2-ethyl hexanoic acid.

The term "neodecanoic acid" as utilized herein refers to mixtures of branched carboxylic acids, generally predominately about 10 carbon atoms. These acid mixtures generally have an acid number of from about 310 to about 325 mg KOH/g. Commercially available neodecanoic acids are supplied by Shell under the tradename, "VERSATIC 10" (commonly referred to as versatic acid) and by Exxon under the tradename "NEODECANOIC ACID." As used herein, the term "neodecanoic acid(s)" comprises the term "versatic acid(s)" as used in the art.

These carboxylic acids are well known and described in, for example Kirk-Othmer, Encyclopedia of Chemical Technology, fourth edition, John Wiley & Son, New York, 1993, Vol.5, pp.147–192, which is incorporated herein by reference.

In general, neodecanoic acids or trialkylacetic acids are characterized by the general structure:

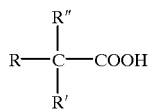

wherein R, R', and R" represent alkyl groups. These acids do not occur naturally but are produced by the Koch Synthesis method in the United States and Europe. They are soluble in hydrocarbon solvents, e.g., hexanes or cyclohexane, and in alcohols but are not soluble in water. Theoretically, the structure for neodecanoic acid is:

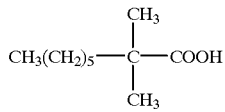

Neodecanoic acids consist of a mixture of highly branched isomers of $C_{10}$ acids. The neodecanoic acids are most preferred for use in the present invention.

The carboxylic acids suitable for use in preparing the Rare Earth carboxylate(s) are also suitable for use in achieving a stabilizing free acid to Rare Earth molar ratio.

In preparing the Rare Earth carboxylate liquids, a carboxylate solution is preferably prepared by reaction of the carboxylic acid with a base which is an alkali metal, alkaline earth metal or ammonium (preferably tetra (lower alkyl) ammonium) oxide, hydroxide, carbonate or hydrogen carbonate. The base suitable for reaction with the carboxylic acid is preferably a hydroxide of an alkali metal of Group I, preferably lithium, sodium or potassium. Most preferably the base is a hydroxide of sodium. Bases suitable for use include: sodium hydroxide, lithium hydroxide, potassium hydroxide, ammonium hydroxide, tetrabutyl ammonium hydroxide, tetra methyl ammonium hydroxide, and tetra ethyl ammonium hydroxide. The reaction of carboxylic acid and base preferably occurs in the presence of water to form the carboxylate solution, i.e., water is the preferred reaction medium. The pH of the carboxylic acid salt solution preferably ranges from about 7.5 to about 12, more preferably from about 8.5 to about 11 and most preferably from about 9 to about 10. Adjustment of the pH to achieve these ranges may be necessary.

The carboxylate, preferably in the form of a salt solution, is then preferably reacted with a Rare Earth nitrate (RE $(NO_3)_3$) to produce the Rare Earth carboxylate in an organic solvent medium. The Rare Earth nitrates suitable for use are the nitrates of group III B of the periodic table (lanthanide series). Suitable Rare Earth nitrates are, for example, the nitrates of lanthanum, cerium, praseodymium, neodymium, promethium, samarium, europium, gadolinium, terbium, dysprosium, holmium erbium, thulium, ytterbium and lutetium. Preferred for use are the nitrates of neodymium, lanthanum, praseodymium, cerium (preferably Ce III) and mixtures thereof. Other Rare Earth salts can be utilized such as Rare Earth chlorides, Rare Earth acetates, or Rare Earth hydroxides. Generally, any water soluble Rare Earth salt, or mixtures of salts, can be utilized.

As indicated above, Rare Earth elements are a group of fifteen chemically related elements in Group IIIB of the periodic table (lanthanide series). The Rare Earth elements preferred for use in the present invention are neodymium, lanthanum, praseodymium, cerium and mixtures thereof. Most preferred is neodymium. Due to the nature of the ores from which these raw materials are made, minor amounts of other Rare Earth elements can be present. Preferred grades for use herein are greater than about 90% by weight of Rare Earth nitrate, Rare Earth chloride, Rare Earth oxide, Rare Earth hydroxides, Rare Earth oxychlorides, Rare Earth oxynitrate, or the like and mixtures thereof.

The reaction medium comprises an organic solvent. Suitable solvents are selected from the group consisting of hexanes, cyclohexane, heptane, methyl pentane, methyl cyclopentane, and the like as well as isomers and mixtures thereof. Organic solvents useful herein include hexanes (with 95% to 99.9% n-hexane content), n-heptane, n-pentane, 3-methylpentane, 2-methylpentane, methylcyclopentane, 2,3-dimethylbutane, toluene and mixtures thereof. Preferred are 3-methylpentane, methylcyclopentane, 2,3-dimethylbutane, toluene, cyclohexane as well as isomers and mixtures thereof. Preferred solvents are selected from the group consisting of hexanes, cyclohexane, heptane as well as isomers and mixtures thereof. Non-polar hydrocarbon solvents like hexanes or cyclohexane are widely used as a polymerization medium. These organic solvents are ideal for use in the compositions of the present invention. A preferred organic solvent is cyclohexane. It is commercially available in an isomer-free form with high purity, greater than about 98%. Another preferred organic solvent is methylpentane which is commercially available under the tradename "EXXSOL METHYLPENTANE NAPHTHA" sold by Exxon. The main ingredients of "EXXSOL METHYLPENTANE NAPHTHA" are: 2-methylpentane (about 50 to 55%) and 3-methylpentane (about 20 to 25%). Another preferred organic solvent is hexanes. It is commercially available as a mixture of n-hexane with varying quantities of hexane isomers. The n-hexane content is preferably greater than about 45% by weight. Preferred for use are polymerization grade organic solvents such as hexanes sold by Exxon under the tradename "EXXSOL HEXANE."

As used herein, "organic solvent" comprises isomers and mixtures thereof. One skilled in the art readily recognizes isomers of compounds, and understands that a different isomeric structure generally results in compounds having similar properties.

The carboxylate and the Rare Earth salt are reacted and a conventional liquid—liquid extraction is performed. After the reaction is complete, the aqueous layer is removed. This can be done by any conventional means. Preferably, the organic layer is then washed with water. The crude liquid can then be adjusted for water and free acid content by conventional means to achieve the appropriate molar ratio of water to Rare Earth element and/or free acid to Rare Earth element. For example, the concentration of water can be adjusted by azeotropic distillation and/or by the addition of water. The free acid concentration can be adjusted by addition of carboxylic acid and/or another stabilizing acid.

The viscosity of the final Rare Earth Carboxylate liquid is preferably less than about 300 cps, more preferably less than about 200 cps and most preferably less than about 50 cps.

The pH of the carboxylate solution may be varied by changing the ratio of carboxylic acid to the base to form the Rare Earth carboxylate liquid having a pH of from about 6 to about 12, preferably about 7 to about 11 and more preferably from about 8 to about 10.

The temperature of the reaction of the carboxylate with the Rare Earth nitrate is preferably less than about 50° C., more preferably about room temperature.

The preferred process for production of the stable concentrated Rare Earth carboxylate liquids is illustrated by the following description for preparing a Nd neodecanoate liquid of the present invention.

There are two main steps.

1. Formulation of carboxylate solution in water

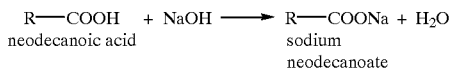

2. Formation of Rare Earth carboxylate (Nd neodecanoate) in water/organic solvent.

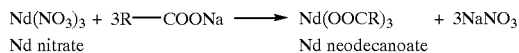

The Nd neodecanoate is prepared in a two solvent system by mixing the Nd nitrate solution and the carboxylate solution. The resulting aqueous layer is discarded. The organic layer may be washed with water.

In order to fall within the free acid to Rare Earth element molar ratio, additional carboxylic acid and/or another stabilizing acid can be added at this stage. The concentration of the free acid can be determined by acid/base titration methods well-known by those skilled in the art. Preferred for use as the basic titrant is a sodium hydroxide solution.

The Nd neodecanoate liquid, in addition to free acid, can comprise water. Water can adversely effect the catalytic activity of Ziegler Natta type catalysts. However, it has been discovered that for stability of the concentrated Rare Earth carboxylate liquids, water can provide stabilizing benefits. The water content can be determined by well-known in the art Karl-Fischer analysis methods. The water content is adjusted to provide the appropriate molar ratio as specified herein. This can be done by removal, e.g., azeotropic distillation and/or by addition of water. The distillation times can differ, depending on the scale and the boiling point of the solvent.

Although the method utilizing water soluble Rare Earth salts, preferably a Rare Earth nitrate, is preferred, those skilled in the art will recognize that other methods for producing Rare Earth carboxylates are suitable for use. One conventional method utilizes a Rare Earth oxide, e.g., $Nd_2O_3$, instead of a water soluble Rare Earth salt. The Rare Earth oxide is charged with the carboxylic acid and a catalyst, e.g., HCl. Insolubles are removed, e.g., by filtration; and the Rare Earth carboxylate liquid is achieved.

It has been discovered that water and/or acid, as additives, are highly effective in stabilizing the concentrated Rare Earth, preferably Nd, carboxylates in organic solvents. Either or both can be present at certain concentrations. Liquids which do not contain any water or free acid form precipitates rapidly. Compositions of the present invention are preferably stable for at least about 3 days, more preferably at least about 7 days, and most preferably at least about 14 days. Preferred compositions are stable for at least about 30 days.

It is essential for stability that the Rare Earth carboxylate liquids have an appropriate water Rare Earth element molar ratio and/or free acid to Rare Earth element molar ratio as well as the requisite Rare Earth concentration. Preferably, both the water to Rare Earth element and the free acid to Rare Earth element molar ratios are within the ranges specified herein.

One skilled in the art will recognize that conventional methods can be utilized to adjust the molar ratios for water, free acid or water and free acid before, during or after the production of the Rare Earth carboxylate.

Water can provide stabilizing benefits to the Rare Earth carboxylate liquids. Particularly, the molar ratio of water to Rare Earth element, within certain ranges, can provide improved stability for the highly concentrated Rare Earth carboxylate liquids. To achieve the appropriate molar ratio, water can be added or removed using conventional means such as azeotropic distillation.

Acid can provide stabilizing benefits to the Rare Earth carboxylate liquids. Acids suitable for use are organic acids which are compatible with the combined organic solvent and Rare Earth carboxylate. Compatibility means the organic acid is soluble to a degree necessary to achieve the requisite free acid concentration. One skilled in the art is capable of making this determination. Particularly, the molar ratio of free acid to Rare Earth element within certain ranges can provide improved stability for the highly concentrated Rare Earth carboxylate liquids. Free acid ($H^+$) concentration can be determined by conventional acid/base titration methods. Preferred for use as the basic titrant is a sodium hydroxide solution. To achieve the free acid ratio, an acid is used. Acids suitable for use include: carboxylic acids including those described supra, acids and esters based on phosphorus compounds, acids and esters based on sulfur compounds, acids and esters based on boron compounds, and mixtures thereof.

Acids and esters based on phosphorus compounds suitable for use include: phosphoric acid ($H_3PO_4$); mono and di alkyl esters of phosphoric acid (e.g., $R^1H_2PO_4$ and $R^1R^2HPO_4$ wherein $R^1$ and $R^2$ are methyl, ethyl, propyl, iso-propyl, butyl, pentyl, hexyl, 2-ethylhexyl and combinations thereof); o-phosphorous acid ($H_3PO_3$); metaphosphoric acid; mono alkyl phosphonic acids (e.g., $RH_2PO_3$ wherein R is methyl, ethyl, or 1-propyl); mono esters of alkyl phosphonic acid (e.g., R $R^1$ $HPO_3$ wherein R is methyl, ethyl, and 1-propyl and $R^1$ is methyl, ethyl, propyl, iso-propyl, butyl, pentyl, hexyl, 2-ethylhexyl, and combinations thereof); organic derivatives of phosphinic acid (e.g., R $R^1$ $HPO_2$ wherein R and $R^1$ are methyl, ethyl, propyl, iso-propyl, butyl, pentyl, hexyl, 2-ethylhexyl and combinations thereof); and mixtures thereof.

Acids and esters based on sulfur compounds suitable for use include: sulfuric acid; pyrosulfuric acid; alkane and arene sulfonic acids (e.g., $RSO_3H$ wherein R is methane, ethane, n-propane, z-propane, butane, pentane, hexane, trifluoromethane, benzene, 3,5-dimethylbenzone, m-nitrobenzene, 2-aminobenzene, 3-aminobenzene, p-dodecylbenzene, p-toluene, 1-naphthalene, 2-naphthalene, 2-acrylamidopropane, 2-acrylamido-2-methylpropane, 2-methacrylamids-2-methylpropane, 3-acrylamido-2,4,4-trimethylpentane, 2-acrylamido-2-phenylethane, 2-acrylamido-2-phenylpropane, 2-acrylamido-2-(p-tolyl) ethane, sulfamic acid ($H_2NSO_3H$); sulfanilic acid (4-($H_2N$)$C_6H_4SO_3H$); alkane and arene sulfinic acids (e.g., $RSO_2H$ wherein R is methane or benzene); and mixtures thereof.

Acids based on boron compounds suitable for use include: boric acid ($B(OH)_3$) and metaboric acid ($HBO_2$).

The acid can be used before, during or after the preparation of the Rare Earth carboxylate. Preferably, acid is utilized during or after the preparation. The acid can be added in a single stage or in several stages. For example, carboxylic acid can be utilized to produce the Rare Earth carboxylate, and if required, additional carboxylic acid can be added after preparation to achieve a suitable molar ratio. In addition, acids can be used in combination or separately. When utilizing combinations, the acids can be premixed and added simultaneously, or added separately. The acid can be added in the form of the acid or as a salt of the acid.

Preferred Rare Earth carboxylates are prepared with naphthenic acid, neodecanoic acid, 2-ethyl hexanoic acid, octanoic acid, and mixtures thereof. The general formula for neodymium neodecanoate is $Nd(C_{10}H_{19}O_2)_3$. The general formula for neodymium 2-ethyl hexanoate and neodymium octanoate is $Nd(C_8H_{15}O_2)_3$.

The Nd neodecanoate liquids of the present invention comprise from about 4.5% to about 14%, preferably from about 6% to about 10% and most preferably from about 7% to about 10% Nd by weight. Preferably, the Nd neodecanoate liquids are prepared utilizing hexanes, cyclohexane, methylpentane, as well as, isomers and mixtures thereof, as the solvent.

The Nd 2-ethylhexanoate, Nd octanoate and Nd napthenate liquids of the present invention comprise from about 4.5% to about 12%, preferably from about 6% to about 10% and most preferably from about 7% to about 10% Nd by weight. Preferably, the Nd 2-ethylhexanoate and Nd napthenate liquids are prepared utilizing hexanes, cyclohexane, methylpentane, as well as, isomers and mixtures thereof, as the solvent.

The Nd neodecanoate, 2-ethylhexanoate, octanoate and naphthenate solutions have a molar ratio of free acid to Nd of less than or equal to about 5, preferably less than or equal to about 2 and most preferably less than or equal to about 1. The molar ratio of water to Nd is less than or equal to about 5, preferably less than or equal to about 0.1 and most preferably less than or equal to about 0.05.

Generally, the Rare Earth carboxylate liquids comprise from about 4.5% to about 20% Rare Earth elements by weight. The Rare Earth carboxylate liquids of the present invention can comprise from about 4.5% to about 14%, preferably from about 6% to about 10% and most preferably from about 7% to about 10%, Rare Earth elements by weight. The molar ratio of water to Rare Earth element is generally less than or equal to about 6, preferably less than or equal to about 0.1 and more preferably less than or equal to about 0.05. The molar ratio of free acid to Rare Earth element is generally less than or equal to about 5, preferably less than or equal to about 2 and more preferably less than or equal to about 1. In practice, the molar ratio of free acid to Rare Earth element is preferably in the range of from about 0.03 to about 5 and the molar ratio of water to Rare Earth elements is preferably in the range of from about 0.03 to about 5. The sum of the molar ratios of free acid to Rare Earth element and water to Rare Earth element is in practice preferably in the range of about 0.35 to about 10. Neodymium (Nd) carboxylates are preferred. For stable solutions, the sum of the molar ratio of water to Rare Earth element and free acid to Rare Earth element is greater than or equal to about 0.35, preferably greater than or equal to about 0.4. Generally, for unstable liquids, the sum of the molar ratios of free acid and water to Rare Earth element is less than about 0.35.

The neodecanoate liquids of the present invention, utilizing hexanes and having a Rare Earth element, preferably Nd, content of from about 4.5% to about 8%, show a transmittance T % of greater than about 90%. The neodecanoate liquids of the present invention, utilizing hexanes and having a Rare Earth element, preferably Nd, content of greater than about 8%, show a transmittance T % of about 75% to about 90%, preferably about 80%. The transmittance of light through the liquids is measured using a Brinkmann PC910 colorimeter at a wavelength of 420 nanometers.

Further, the Rare Earth carboxylate liquids can provide excellent properties as raw materials for making catalysts. Catalysts made from the products of the present invention have excellent and/or improved properties for utilization in polymerization of conjugated dienes, especially 1,3-butadiene, isoprene, 1,3-pentadiene and 2-methyl-1,3 pentadiene and mixtures thereof. Fields of application include any appropriate for the utilization of polybutadiene, for example in the manufacture of tires and technical rubber articles.

These liquids can be utilized as raw materials for the production of catalysts suitable for the polymerization of conjugated dienes, such as butadiene or isoprene. A preferred method for polymerizing conjugated dienes comprises polymerizing the conjugated diene in the presence of a catalytic amount of a Ziegler-Natta catalyst which is prepared utilizing the product of the present invention. Any conventional polymerization method can be utilized with Ziegler-Natta catalysts prepared utilizing the products of the present invention with good effect.

The following examples are provided to better describe and define the process and product of the present invention. They are for illustrative purposes and it is realized that changes or variations may be made with respect to these compositions that are not shown below. Such changes which do not materially alter the compositions, formulation, process or function are still considered to fall within the spirit and scope of the invention as recited by the claims that follow.

EXAMPLE 1

The following example illustrates a procedure for preparing a concentrated Rare Earth carboxylate liquid of the present invention:

In a 2-liter reactor, a Na neodecanoate/water solution having a pH range of from about 9.3 to about 10.0 (at 25° C.) is prepared by charging 250 g of NaOH solution (20%) with about 215 g neodecanoic acid (MW173). To the clear, colorless solution are first added 725 g of industrial grade hexanes at 25° C., and then the Nd nitrate aqueous solution (235 g; Nd content 25.56%). The latter is added dropwise under vigorous mixing, in a period of about 40 minutes. The product precipitates out immediately in the aqueous layer and dissolves quickly in the organic layer. After complete addition, the mixture is stirred for an additional 30 minutes and the aqueous layer is discarded. The organic layer is washed with 3×250 ml water. The crude Nd neodecanoate solution is analyzed to contain 1.5% free acid and 1.1% water. At this point additional carboxylic acid is added to achieve the appropriate quantity of 7.6%. The reactor is then equipped with a Dean-Stark adapter and the required quantity of water removed by azeotropic distillation. The final product is a stable, clear, bluish solution. (Yield of about 998 g.) Analysis determines the product to have:

Nd 6.5% free neodecanoic acid 7.6% water 149 ppm.

Free neodecanoic acid/Nd molar ratio:

7.6 g/173.1=0.044 m(173.1=mol. weight of neodecanoic acid)

6.5 g/144.24=0.045 m(144.24=atomic weight of Nd)

0.044/0.045=0.97

Water/Nd molar ratio:

0.0149 g/18=0.00082 (18=mol. weight of water)

6.5 g/144.24=0.045 m (144.24=atomic weight of Nd)

0.00082/0.045=0.018 sum of both molar ratios: 0.98

The product's viscosity is 10 cps as determined by Brookfield viscometer. The sum of the molar ratios of water to Rare Earth element and free acid to Rare Earth element is greater than or equal to about 0.35.

EXAMPLE 2

The following example illustrates a procedure for preparing a concentrated Rare Earth carboxylate liquid of the present invention:

In a 2-liter reactor, $Nd_2O_3$ is charged with 315 g of neodecanoic acid 625 g of industrial grade hexanes and catalytic quantities of conc. HCl (37%) and stirred at room temperature for about 3 hrs. The product is separated from insoluble particles by filtration to yield a clear bluish solution. The concentration of the water present can be adjusted by azeotropic distillation with a Dean-Stark adapter. The yield is 998 g. The final product is a stable, clear, bluish solution. Analysis determines the product to have:

Nd 6.1% free neodecanoic acid 10% water 100 ppm.

The product's viscosity is <10 cps as determined by Brookfield Viscometer. The sum of the molar ratios of water to Rare Earth element and free acid to Rare Earth element is greater than or equal to about 0.35.

EXAMPLE 3

The following example is presented for comparison to Examples 1 and 2:

The procedure of Example 1 is repeated except that no additional free acid is added to the crude Nd neodecanoate solution and the water concentration is reduced to less than about 100 ppm by azeotropic distillation. During the distillation, the viscosity of the solution increases. After completion of the distillation, analysis determines the product to have:

Nd 6.1% free neodecanoic acid 1.5% water 82 ppm

Free neodecanoic acid/Nd molar ratio:

1.5 g/173.1=0.0086 m (173.1=mol. weight of neodecanoic acid)

6.1 g/144.24=0.042 m (144.24=atomic weight of Nd)

0.0086/0.042=0.21

Water/Nd molar ratio:

0.0082 g/18=0.0004 (18=mol. weight of water)

6.1 g/144.24=0.042 m (144.24=atomic weight of Nd)

0.0004/0.042=0.01 sum of both molar ratios: 0.22

The product precipitates in the next few hours (less than about 6 hours). The sum of the molar ratios of water to Rare Earth element and free acid to Rare Earth element is less than 0.35.

EXAMPLE 4

The following example relates to polymerization of butadiene with a Nd neodecanoate solution of the present invention:

A 200 ml glass reactor containing 100 g of a hexane-butadiene solution (concentration butadiene 14%) is charged with a catalyst mixture consisting of: a) 0.033 ml of a Nd neodecanoate hexane solution (Nd 9.5%) prepared in accordance with the present invention and having the sum of the molar ratios of water to Rare Earth element and free acid to Rare Earth element of greater than about 0.35; b) 0.01 ml of ethylaluminumsesquichloride (1 m solution in cyclohexane); and c) 0.38 ml of di-isobutylaluminumhydride (1 m solution in hexanes). The temperature is raised to 85° C. in the next 30 minutes and cooled down to room temperature in the following 45 minutes. The produced polymer is precipitated out by using 500 ml methonal, containing 0.5 g of butylated hydroxytoluene. The yield of polybutadiene is about 13.7 g (98%) with a cis content of about 97% and molecular weight of 290,000 [g/mol].

What is claimed is:

1. A Rare Earth carboxylate liquid composition comprising:

i) a Rare Earth carboxylate, ii) water, and iii) organic solvent;

wherein the molar ratio of water to Rare Earth element is less than or equal to about 6 and from about 10% to about 20%, by weight of the composition, comprises the Rare Earth element.

2. A Rare Earth carboxylate liquid composition according to claim 1, wherein the Rare Earth carboxylate is a Rare Earth carboxylate of a carboxylic acid having 6 to 32 carbons.

3. A Rare Earth carboxylate liquid composition according to claim 1, wherein the Rare Earth carboxylate is selected from the group consisting of neodymium carboxylate, lanthanum carboxylate, praesodymium carboxylate, cerium carboxylate and mixtures thereof.

4. A Rare Earth carboxylate liquid composition according to claim 3, wherein the organic solvent is selected from the group consisting of hexane, cyclohexane, heptane, pentane, methylpentane, methylcyclopentane, butane, toluene and mixtures thereof.

5. A Rare Earth carboxylate liquid composition according to claim 3, wherein from about 10% to about 14% by weight of the composition comprises Rare Earth element.

6. A Rare Earth carboxylate liquid composition according to claim 1, wherein the molar ratio of water to Rare Earth element is less than or equal to about 0.1.

7. A Rare Earth carboxylate liquid composition according to claim 3, wherein the Rare Earth carboxylate is a Rare Earth carboxylate of a carboxylic acid selected from the group consisting of: isopentanoic acid, hexanoic acid, 2-ethyl butyric acid, nonanoic acid, decanoic acid, 2-ethyl hexanoic acid, iso octanoic acid, octanoic acid, isononanoic acid, neodecanoic acid, undecyclenic acid, lauric acid, palmitic acid, stearic acid, oleic acid, linoleic acid, naphthenic acid, and mixtures thereof.

8. A Rare Earth carboxylate liquid composition according to claim 3, wherein the Rare Earth carboxylate is a Rare Earth carboxylate of a carboxylic acid selected from the group consisting of: neodecanoic acid, 2-ethyl hexanoic acid, naphthenic acid, 2-methyl butanoic acid, 3-methyl butanoic acid, 2,2-dimethyl propanoic acid, 3,5-dimethyl hexanoic acid, 2-ethyl pentanoic acid, 2,5-dimethyl hexanoic acid, 3-ethyl hexanoic acid, 2,2,4-trimethyl hexanedioic acid, 3,3,4-trimethyl hexanedioic acid, neodecanoic acid, octanoic acid, 2,6-dimethyl octanoic acid, 4,6-dimethyl octanoic acid, 2,4,6-trimethyl octanoic acid, 2,4,6-trimethyl nonanoic acid, 2,4,6-trimethyl nonacosanoic acid and mixtures thereof.

9. A Rare Earth carboxylate liquid composition according to claim 8, wherein the carboxylic acid is selected from the group consisting of: naphthenic acid, neodecanoic acid, 2-ethyl hexanoic acid, octanoic acid and mixtures thereof.

10. A Rare Earth carboxylate liquid composition according to claim 9, wherein the organic solvent is selected from the group consisting of hexanes, cyclohexane, methylpentane, heptane and mixtures thereof.

11. A Rare Earth carboxylate liquid composition according to claim 10, wherein the Rare Earth element is neodymium.

12. A Rare Earth carboxylate liquid composition according to claim 9, wherein the molar ratio of water to Rare Earth element is from about 0.03 to about 5.

13. A Rare Earth carboxylate liquid composition according to claim 9, wherein the molar ratio of water to Rare Earth element is less than or equal to about 0.05.

14. A Rare Earth carboxylate liquid composition comprising:
   i) a Rare Earth carboxylate,
   ii) free acid, and
   iii) organic solvent;
wherein the molar ratio of free acid to Rare Earth element is less than or equal to about 5 and from about 10% to about 20%, by weight of the composition, comprises Rare Earth element.

15. A Rare Earth carboxylate liquid composition according to claim 14, wherein the Rare Earth carboxylate is selected from the group consisting of neodymium carboxylate, lanthanum carboxylate, praesodymium carboxylate, cerium carboxylate and mixtures thereof.

16. A Rare Earth carboxylate liquid composition according to claim 15, wherein the organic solvent is selected from the group consisting of hexanes, cyclohexane, heptane, pentane, methylpentane, methylcyclopentane, butane, toluene and mixtures thereof.

17. A Rare Earth carboxylate liquid composition according to claim 15, wherein from about 10% to about 14% by weight of the composition is the Rare Earth element.

18. A Rare Earth carboxylate liquid composition according to claim 14, wherein the molar ratio of free acid to Rare Earth element is less than or equal to about 2.

19. A Rare Earth carboxylate liquid composition according to claim 14, wherein said free acid is derived from an acid selected from the group consisting of: mono and di carboxylic acids; phosphorus based acids and esters thereof; sulfur based acids and esters thereof; boron based acids; and mixtures thereof.

20. A Rare Earth carboxylate liquid composition according to claim 19, wherein said acid is selected from the group consisting of: isopentanoic acid; hexanoic acid; 2-ethyl butyric acid; nonanoic acid; decanoic acid; 2-ethyl hexanoic acid; iso octanoic acid; octanoic acid; isononanoic acid; neodecanoic acid; undecyclenic acid; lauric acid; palmitic acid; stearic acid; oleic acid; linoleic acid; naphthenic acid; phosphoric acid; o-phosphorus acid; mono alkyl phosphonic acids; mono esters of alkyl phosphonic acid; organic derivatives of phosphinic acid, sulfuric acid; pyrosulfuric acid; alkane and arene sulfonic acids; sulfamic acid; sulfanilic acid; alkane and arene sulfinic acids; boric acid; metaboric acid, and mixtures thereof.

21. A Rare Earth carboxylate liquid composition according to claim 15, wherein the Rare Earth carboxylate is a carboxylate of an acid selected from the group consisting of: isopentanoic acid, hexanoic acid, 2-ethyl butyric acid, nonanoic acid, decanoic acid, 2-ethyl hexanoic acid, iso octanoic acid, octanoic acid, isononanoic acid, neodecanoic acid, undecyclenic acid, lauric acid, palmitic acid, stearic acid, oleic acid, linoleic acid, naphthenic acid; and mixtures thereof.

22. A Rare Earth carboxylate liquid composition according to claim 15, wherein the Rare Earth carboxylate is a carboxylate of an acid selected from the group consisting of neodecanoic acid, 2-ethyl hexanoic acid, naphthenic acid, 2-methyl butanoic acid, 3-methyl butanoic acid, 2,2-dimethyl propanoic acid, 3,5-dimethyl hexanoic acid, 2-ethyl pentanoic acid, 2,5-dimethyl hexanoic acid, 3-ethyl hexanoic acid, 2,2,4-trimethyl hexanedioic acid, 3,3,4-trimethyl hexanedioic acid, neodecanoic acid, octanoic acid, 2,6-dimethyl octanoic acid, 4,6-dimethyl octanoic acid, 2,4,6-trimethyl octanoic acid, 2,4,6-trimethyl nonanoic acid, 2,4,6-trimethyl nonacosonoic acid; and mixtures thereof.

23. A Rare Earth carboxylate liquid composition according to claim 21, wherein the acid is selected from the group consisting of naphthenic acid, neodecanoic acid, 2-ethylhexanoic acid, octanoic acid and mixtures thereof.

24. A Rare Earth carboxylate liquid composition according to claim 23, wherein the organic solvent is selected from the group consisting of hexanes, cyclohexane, methylpentane, heptane and mixtures thereof.

25. A Rare Earth carboxylate liquid composition according to claim 24, wherein the Rare Earth carboxylate is a neodymium carboxylate.

26. A Rare Earth carboxylate liquid composition according to claim 23, wherein the molar ratio of free acid to Rare Earth element is in the range of from about 0.03 to about 5.

27. A Rare Earth carboxylate liquid composition according to claim 14, wherein the molar ratio of free acid to Rare Earth element is less than or equal to about 1.

28. A Rare Earth carboxylate liquid composition according to claim 14, wherein viscosity is less than about 300 cps.

29. A Rare Earth carboxylate liquid composition according to claim 14, wherein viscosity is less than about 200 cps.

30. A Rare Earth carboxylate liquid composition according to claim 14, further comprising water; wherein the molar ratio of water to Rare Earth element is less than or equal to about 6.

31. A Rare Earth carboxylate liquid composition according to claim 30, wherein the molar ratio of water to Rare Earth element is less than or equal to about 0.1.

32. A Rare Earth carboxylate liquid composition according to claim 1, wherein viscosity is less than about 300 cps.

33. A Rare Earth carboxylate liquid composition according to claim 32, wherein viscosity is less than about 200 cps.

34. A process for making Rare Earth carboxylate liquid compositions comprising the steps of:
   adding an acid selected from the group consisting of: mono and di carboxylic acids; phosphorus based acids and esters thereof; sulfur based acids and esters thereof;

boron based acids; and mixtures thereof to achieve a molar ratio of free acid to Rare Earth element of less than or equal to about 5;
wherein from about 10% to about 20%, by weight of the composition, is Rare Earth element.

35. A process according to claim 34, wherein said acid is selected from the group consisting of: isopentanoic acid; hexanoic acid; 2-ethyl butyric acid; nonanoic acid; decanoic acid; 2-ethyl hexanoic acid; iso octanoic acid; octanoic acid; isononanoic acid; neodecanoic acid; undecyclenic acid; lauric acid; palmitic acid; stearic acid; oleic acid; linoleic acid; naphthenic acid; phosphoric acid; o-phosphorus acid; mono alkyl phosphonic acids; mono esters of alkyl phosphonic acid; organic derivatives of phosphinic acid, sulfuric acid; pyrosulfuric acid; alkane and arene sulfonic acids; sulfamic acid; sulfanilic acid; alkane and arene sulfinic acids; boric acid; metaboric acid, and mixtures thereof.

36. A process according to claim 35, wherein the molar ratio of free acid to Rare Earth element is less than or equal to about 1.

37. A process for making Rare Earth carboxylate liquid compositions having from about 10% to about 20% Rare Earth element comprising the steps of:
adding water to achieve a molar ratio of water to Rare Earth element of less than or equal to about 6.

38. A process according to claim 37, wherein the molar ratio is less than or equal to about 0.1.

39. A process for making Rare Earth carboxylate liquid compositions in which from about 10% to about 20%, by weight of the composition, is Rare Earth element, the process comprising the steps of:
a) adjusting the molar ratio of free acid to Rare Earth element to less than or equal to about 5; or
b) adjusting the molar ratio of water to Rare Earth element to less than or equal to about 6; or
c) adjusting the molar ratio of free acid to Rare Earth element and the molar ratio of water to Rare Earth element such that the sum of the molar ratios is greater than or equal to about 0.35.

40. A process according to claim 39, wherein said molar ratio of free acid to Rare Earth element is less than or equal to about 2; said molar ratio of water to Rare Earth element is less than or equal to about 0.1; and said sum of the molar ratios is greater than or equal to about 0.4.

41. A process for making Rare Earth carboxylate liquid compositions in which from about 10% to about 20%, by weight of the composition, is Rare Earth element, the process comprising the steps of:
a) preparing a carboxylate solution having a pH of from about 7.5 to about 12 by reacting a carboxylic acid with a base in water;
b) reacting said carboxylate solution with a water soluble Rare Earth salt in the presence of an organic solvent to form a liquid having an aqueous layer and an organic layer;
c) removing said aqueous layer;
d) adjusting the molar ratio of free acid to Rare Earth element to less than or equal to about 5 or adjusting the molar ratio of water to Rare Earth element to less than or equal to about 6 or adjusting both the molar ratio of free acid to Rare Earth element and the molar ratio of water to Rare Earth element such that the sum of the molar ratios is greater than or equal to about 0.35.

42. A process according to claim 41, wherein the pH of the carboxylic acid salt solution is from about 8.5 to about 11.

43. A Rare Earth carboxylate liquid composition comprising:

i) neodymium neodecanoate of the general formula $Nd(C_{10}H_{19}O_2)_3$;
ii) free acid; and
iii) organic solvent selected from the group consisting of hexanes, cyclohexane, methylpentane, heptane, and mixtures thereof;
wherein the molar ratio of free acid to Rare Earth element is less than or equal to about 5 and from about 10% to about 14% by weight of the composition comprises the Rare Earth element.

44. A Rare Earth carboxylate liquid composition according to claim 43, wherein the organic solvent is hexane, the ratio of free acid to Rare Earth element is less than or equal to about 1.

45. A Rare Earth carboxylate liquid composition comprising:
i) neodymium neodecanoate of the general formula $Nd(C_{10}H_{19}O_2)_3$;
ii) water; and
iii) organic solvent selected from the group consisting of hexane, cyclohexane, methylpentane and mixtures thereof;
wherein the molar ratio of water to Rare Earth element is less than or equal to about 5 and from about 10% to about 14% by weight of the composition comprises the Rare Earth element.

46. A Rare Earth carboxylate liquid composition according to claim 45, wherein the molar ratio of water to Rare Earth element is less than or equal to about 0.05.

47. A Rare Earth carboxylate liquid composition comprising:
i) a Rare Earth carboxylate selected from the group consisting of neodymium 2-ethylhexanoate, neodymium octanoate, and neodymium naphthenate;
ii) a carboxylic acid selected from the group consisting of 2-ethylhexanoic acid, octanoic acid and naphthenic acid;
iii) an organic solvent selected from the group consisting of hexanes, cyclohexane, methylpentane, heptane and mixtures thereof;
wherein the molar ratio of free acid to Rare Earth element is less than or equal to about 5 and from about 10% to about 12% by weight of the composition comprises the Rare Earth element.

48. A Rare Earth carboxylate liquid composition according to claim 47, wherein the molar ratio of free acid to Rare Earth element is less than or equal to about 1.

49. A Rare Earth carboxylate liquid composition comprising:
i) a Rare Earth carboxylate selected from the group consisting of neodymium 2-ethylhexanoate, neodymium octanoate and neodymium naphthenate;
ii) water; and
iii) an organic solvent selected from the group consisting of hexanes, cyclohexane, methylpentane, heptane and mixtures thereof;
wherein the molar ratio of water to Rare Earth element is less than or equal to about 5 and from about 10% to about 12% by weight of the composition comprises the Rare Earth element.

50. A Rare Earth carboxylate liquid composition according to claim 49, wherein the molar ratio of water to the Rare Earth element is less than or equal to about 0.05.

51. A Rare Earth carboxylate liquid composition according to claim 14, further comprising water and wherein the sum of the molar ratios for water to Rare Earth element and free acid to Rare Earth element is greater than or equal to about 0.35.

52. A Rare Earth carboxylate liquid composition according to claim 1, further comprising acid and wherein the sum of the molar ratios for water to Rare Earth element and free acid to Rare Earth element is greater than or equal to about 0.35.

53. A Rare Earth carboxylate liquid composition according to claim 1, further comprising acid and wherein the sum of the molar ratios for water to Rare Earth element and free acid to Rare Earth element is greater than or equal to about 0.4.

54. A process for making Rare Earth carboxylate liquid compositions in which from about 10% to about 20%, by weight of the composition, is Rare Earth element, the process comprising the steps of:

adjusting the water, free acid, or water and free carboxylic acid content such that the sum of the molar ratios for water to Rare Earth element and free acid to Rare Earth element is greater than or equal to about 0.35.

55. A catalyst composition comprising a Rare Earth carboxylate liquid comprising:

i) a Rare Earth carboxylate, ii) free acid, iii) an organic solvent, and iv) water, wherein the molar ratio of water to Rare Earth element is less than or equal to about 6, the molar ratio of free acid to Rare Earth element is less than or equal to about 5 or the sum of the molar ratios for water to Rare Earth element and free acid to Rare Earth element is greater than or equal to about 0.35 and from about 10% to about 20%, by weight of the composition, comprises Rare Earth element.

56. A catalyst according to claim 55, wherein said molar ratio of water to Rare Earth element is less than or equal to about 0.1, said molar ratio of free acid to Rare Earth element is less than or equal to about 2, or said sum of the molar ratios for water to Rare Earth element and free acid to Rare Earth element is greater than or equal to about 0.4.

57. A catalyst composition according to claim 56, wherein said Rare Earth element comprises from about 10% to about 14%.

58. A method for polymerizing conjugated dienes comprising the step of: polymerizing the conjugated diene in the presence of a catalyst comprising:

i) a Rare Earth carboxylate, ii) an organic solvent, iii) water, and iv) free acid, wherein the molar ratio of water to Rare Earth element is less than or equal to about 6, the molar ratio of free acid to Rare Earth element is less than or equal to about 5 or the sum of the molar ratios for water to Rare Earth element and free acid to Rare Earth element is greater than or equal to about 0.35 and from about 10% to about 20%, by weight of the composition, comprises Rare Earth element.

59. A method for polymerization of conjugated dienes comprising the step of polymerizing the conjugated diene in the presence of a catalyst according to claim 56.

60. A method according to claim 59, wherein said conjugated diene is selected from the group consisting of butadiene, isoprene and mixtures thereof.

* * * * *